(12) United States Patent
Kodera et al.

(10) Patent No.: US 12,096,158 B2
(45) Date of Patent: Sep. 17, 2024

(54) INFORMATION COLLECTING SYSTEM AND INFORMATION COLLECTING METHOD

(71) Applicant: TOYOTA JIDOSHA KABUSHIKI KAISHA, Aichi-ken (JP)

(72) Inventors: Hiroaki Kodera, Susono (JP); Yoichiro Isami, Mishima (JP); Kotoru Sato, Susono (JP); Takashi Hayashi, Nagoya (JP); Naohiro Seo, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 261 days.

(21) Appl. No.: 17/749,073

(22) Filed: May 19, 2022

(65) Prior Publication Data

US 2022/0377284 A1  Nov. 24, 2022

(30) Foreign Application Priority Data

May 21, 2021  (JP) ................................ 2021-086484

(51) Int. Cl.
 *H04N 7/18* (2006.01)
 *G06Q 30/0201* (2023.01)
(52) U.S. Cl.
 CPC ......... *H04N 7/181* (2013.01); *G06Q 30/0201* (2013.01)
(58) Field of Classification Search
 CPC ..... H04N 7/181; H04N 7/183; G06Q 30/0201
 See application file for complete search history.

(56) References Cited

U.S. PATENT DOCUMENTS

2019/0286843 A1  9/2019  Fukuhara et al.

FOREIGN PATENT DOCUMENTS

| EP | 3764228 A1 * | 1/2021 | .......... G06F 11/3006 |
| JP | 2018005536 A * | 1/2018 | |
| JP | 2019159773 A | 9/2019 | |
| JP | 2021056709 A * | 4/2021 | |

* cited by examiner

*Primary Examiner* — Florian M Zeender
*Assistant Examiner* — Emily M Kraisinger
(74) *Attorney, Agent, or Firm* — HAUPTMAN HAM, LLP

(57) ABSTRACT

In an information collecting system, an information collecting device managed by the designated institution sets information acquisition spaces where acquisition of personal information of residents in the region is allowed and information acquisition prohibited spaces where acquisition of personal information of residents is prohibited, the information collecting device transmits space information corresponding to spaces in which information acquisition terminals are located, for information acquisition terminals which are located in information acquisition spaces and information acquisition prohibited spaces and which allow acquisition of personal information of residents, and the information acquisition terminal determines that personal information acquired by an information acquisition terminal is not to be transmitted to an information collecting device when the information acquisition terminal is located in an information acquisition prohibited space, based on the received space information.

15 Claims, 11 Drawing Sheets

INFORMATION COLLECTING SYSTEM AND INFORMATION COLLECTING METHOD

RELATED APPLICATIONS

The present application claims priority of Japanese Patent Application No. 2021-086484 filed May 21, 2021, the disclosure of which is hereby incorporated by reference herein in its entirety.

FIELD

The present invention relates to an information collecting system and an information collecting method.

BACKGROUND

With the large number of problems faced by cities in recent years, there have been proposed cities or districts that are managed in a manner utilizing data transmission techniques, allowing overall optimization in a sustainable manner ("smart cities").

In smart cities, management agencies execute management of resident life, traffic, energy, administration, industry and education, for example. A management agency acquires personal information of residents for the purpose of planning, maintenance, managing and operation of the smart city.

However, management agencies can potentially be a source of problems when personal information of residents is acquired without consent of the residents.

Japanese Unexamined Patent Publication No. 2019-159773, for example, proposes a data delivery control device that acquires a request value for personal user information which has been requested by consumer, compares the request value with personal user information managed by a user data management unit, and when the personal user information includes request matching data matching the request value, and acquires information regarding whether or not the user is allowed provision of the request matching data, and sends the request matching data in a manner obtainable by the consumer according to whether or not the user is allowed.

SUMMARY

Smart cities have many residents living in them, with a large variety of personal information for each resident. It is therefore a burden on the management agency to obtain consent from residents each time personal information is to be obtained from a resident.

It is an object of the present invention to provide an information collecting system that reduces the processing required for a designated institution to obtain personal information for residents living in a region such as a smart city, in which multiple residents live and which is managed by the institution.

According to one embodiment there is provided an information collecting system. The information collecting system is an information collecting system that collects personal information for residents in a region in which multiple residents live and which is managed by a designated institution, the system having an information acquisition terminal that allows acquisition of personal information of residents, and an information collecting device that is connected in a communicable manner to the information acquisition terminal and is managed by the designated institution, wherein the information collecting device has a setting unit that sets information acquisition spaces where acquisition of personal information of residents in the region is allowed and information acquisition prohibited spaces where acquisition of personal information of residents is prohibited, and an information transmitter that transmits space information corresponding to a space in which an information acquisition terminal is located, for each of information acquisition terminals located in the information acquisition spaces and the information acquisition prohibited spaces, and the information acquisition terminal has an information acquisition control unit that determines that personal information acquired by the information acquisition terminal is not to be transmitted to an information collecting device when the information acquisition terminal is located in an information acquisition prohibited space, based on the received space information.

In this information collecting system, the information acquisition terminal preferably has a notification unit that notifies residents of information, and a notification control unit that notifies a resident located in an information acquisition space that the resident is located in an information acquisition space, via the notification unit, and that also notifies a resident located in an information acquisition prohibited space that the resident is located in an information acquisition prohibited space, via the notification unit.

In this information collecting system, the setting unit preferably sets the information acquisition space or information acquisition prohibited space in the region based on the location, date, time or day of the week.

In this information collecting system, the setting unit also preferably sets the information acquisition space or information acquisition prohibited space in a room within the residence of the resident.

In this information collecting system, the setting unit also preferably sets the information acquisition space or information acquisition prohibited space in a space within a shop.

In this information collecting system, the setting unit also preferably sets the information acquisition space or information acquisition prohibited space in the region based on the location of a cash register in a shop.

In this information collecting system, preferably the information acquisition terminal also has an imaging unit, and the setting unit sets the information acquisition space based on the visual field of the imaging unit.

In this information collecting system, the setting unit also preferably sets the information acquisition space or information acquisition prohibited space in the cabin of a vehicle that can transport a resident.

In this information collecting system, the setting unit also preferably sets the information acquisition space or information acquisition prohibited space in the cabin of a vehicle based on the driving route of the vehicle.

In this information collecting system, the information collecting device preferably has an applying unit that generates incentive information indicating an incentive to be applied to a resident that has provided personal information in an information acquisition space.

According to yet another embodiment of the invention there is provided an information collecting method. The information collecting method is one in which personal information is collected for residents in a region where multiple residents live and which is managed by a designated institution, wherein information collecting devices managed by the designated institution set an information acquisition spaces where acquisition of personal information of residents in the region is allowed and information acquisition prohibited spaces where acquisition of personal information of residents is prohibited, the information collecting devices are located in the information acquisition spaces and the information acquisition prohibited spaces and transmit space information corresponding to each space in which an information acquisition terminal that can acquire personal information of residents is located, to that information acquisition terminal, and the information acquisition terminal determines that personal information acquired by the information acquisition terminal is not to be transmitted to the information collecting device when the information acquisition terminal is located in an information acquisition prohibited space, based on the received space information.

The information collecting system of the invention exhibits an effect of reducing the processing required for a designated institution to obtain personal information for multiple residents living in a smart city, in a region managed by the institution.

The object and advantages of the invention will be realized and attained by means of the elements and combinations particularly pointed out in the claims. It is to be understood that both the foregoing general description and the following detailed description are exemplary and explanatory and are not restrictive of the invention, as claimed

DESCRIPTION OF EMBODIMENTS

Figure 1:
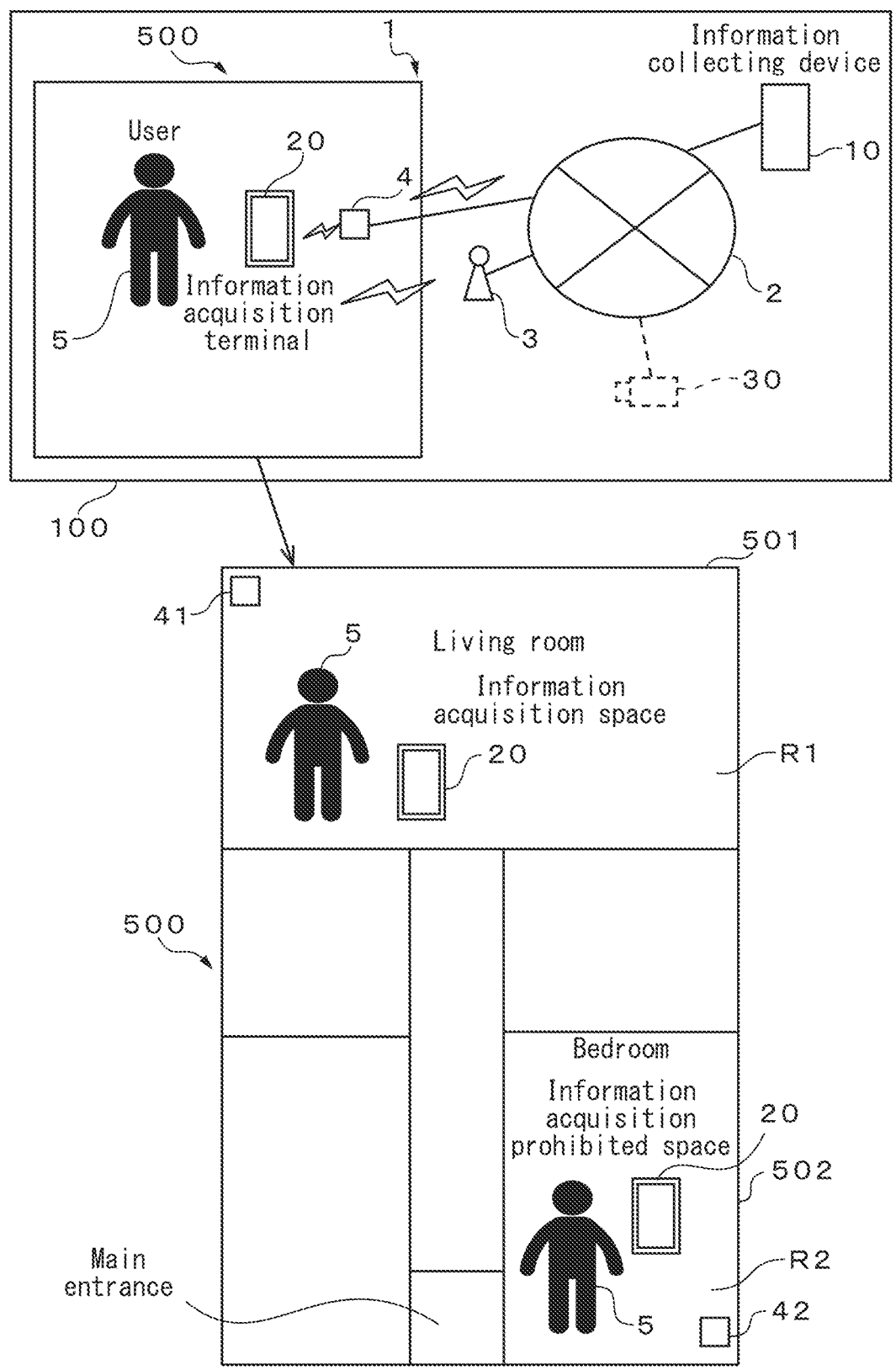
FIG. 1 is a diagram illustrating in overview an information collecting system according to an embodiment of the invention.

FIG. 1 is a diagram illustrating in overview an information collecting system according to an embodiment. Operation relating to information collection processing by the information collecting system 1 disclosed herein will now be described in overview with reference to FIG. 1.

According to this embodiment, the information collecting system 1 collects personal information for residents 5 in a smart city 100, as an example of a region where multiple residents 5 live and which is managed by a designated management agency.

The information collecting system 1 has an information collecting device 10 managed by a management agency, and at least one information acquisition terminal 20. The information acquisition terminal 20 is carried by the residents 5 of the smart city 100, allowing acquisition of personal information of the residents 5.

For example, by accessing a wireless base station 3 (hereunder also known as a macrocell base station 3) which provides macrocells connected via a communication network 2 and gateway (not shown), the information acquisition terminal 20 is connected with the information collecting device 10 via the macrocell base station 3 and communication network 2. In addition, by accessing a wireless base station 4 (hereunder also referred to as "small cell base station 4") which provides small cells connected via a communication network 2 and gateway (not shown), using wireless communication or wired communication, the information acquisition terminal 20 is also connected with information collecting device 10 via the small cell base station 4 and communication network 2.

While only a single information acquisition terminal 20 is shown in FIG. 1, the information collecting system 1 may have a plurality of information acquisition terminals 20. Likewise, more than one macrocell base station 3 or small cell base station 4 may be connected to the communication network 2.

The information collecting device 10 sets an information acquisition space R1 where acquisition of personal information of a resident 5 is allowed, in the living room 501 of the residence 500 of the resident 5. The information collecting device 10 also sets an information acquisition prohibited space R2 where acquisition of personal information of the resident 5 is prohibited, in the bedroom 502 of the residence 500.

For the information acquisition terminal 20 located in the living room 501, as the information acquisition space R1, the information collecting device 10 transmits space information representing the information acquisition space R1 corresponding to the space where the information acquisition terminal 20 is located, via the communication network 2 and small cell base station 41.

The information acquisition terminal 20 located in the living room 501, as the information acquisition space R1, transmits personal information acquired by the information acquisition terminal 20 to the information collecting device 10. The personal information may be, for example, web browsing information, mail send/receive information, electronic commerce information or camera-photographed images.

For the information acquisition terminal 20 located in the bedroom 502, as an information acquisition prohibited space R2, the information collecting device 10 transmits space information representing the information acquisition prohibited space R2 corresponding to the space where the information acquisition terminal 20 is located, via the communication network 2 and small cell base station 42.

The information acquisition terminal 20 located in the bedroom 502, which is the information acquisition prohibited space R2, does not transmit personal information acquired by the information acquisition terminal 20 to the information collecting device 10. For the resident 5 in the bedroom 502, personal information acquired by the information acquisition terminal 20 is not transmitted to the information collecting device 10.

By making a request to the management agency, the resident 5 can register in the information collecting device 10 a room where acquisition of personal information is to be allowed within the residence 500, as a room in the residence 500 that is to be an information acquisition space R1. Likewise, by making a request to the management agency, the resident 5 can register in the information collecting device 10 a room where acquisition of personal information within the residence 500 is not desired, as a room in the residence 500 that is to be an information acquisition prohibited space R2.

When acquisition of personal information is allowed in the residence 500, the resident 5 can operate the information acquisition terminal 20 in the living room 501 as an information acquisition space R1. When it is not desired for personal information to be acquired in the residence 500, on the other hand, the resident 5 may move to the bedroom 502 which is the information acquisition prohibited space R2, to prevent acquisition of personal information by the information collecting device 10.

In this way, the information collecting system 1 can reduce the processing required for the management agency to acquire personal information of the resident 5 in the smart city 100 that has multiple residents 5 living in it and that is managed by the management agency.

Figure 2:
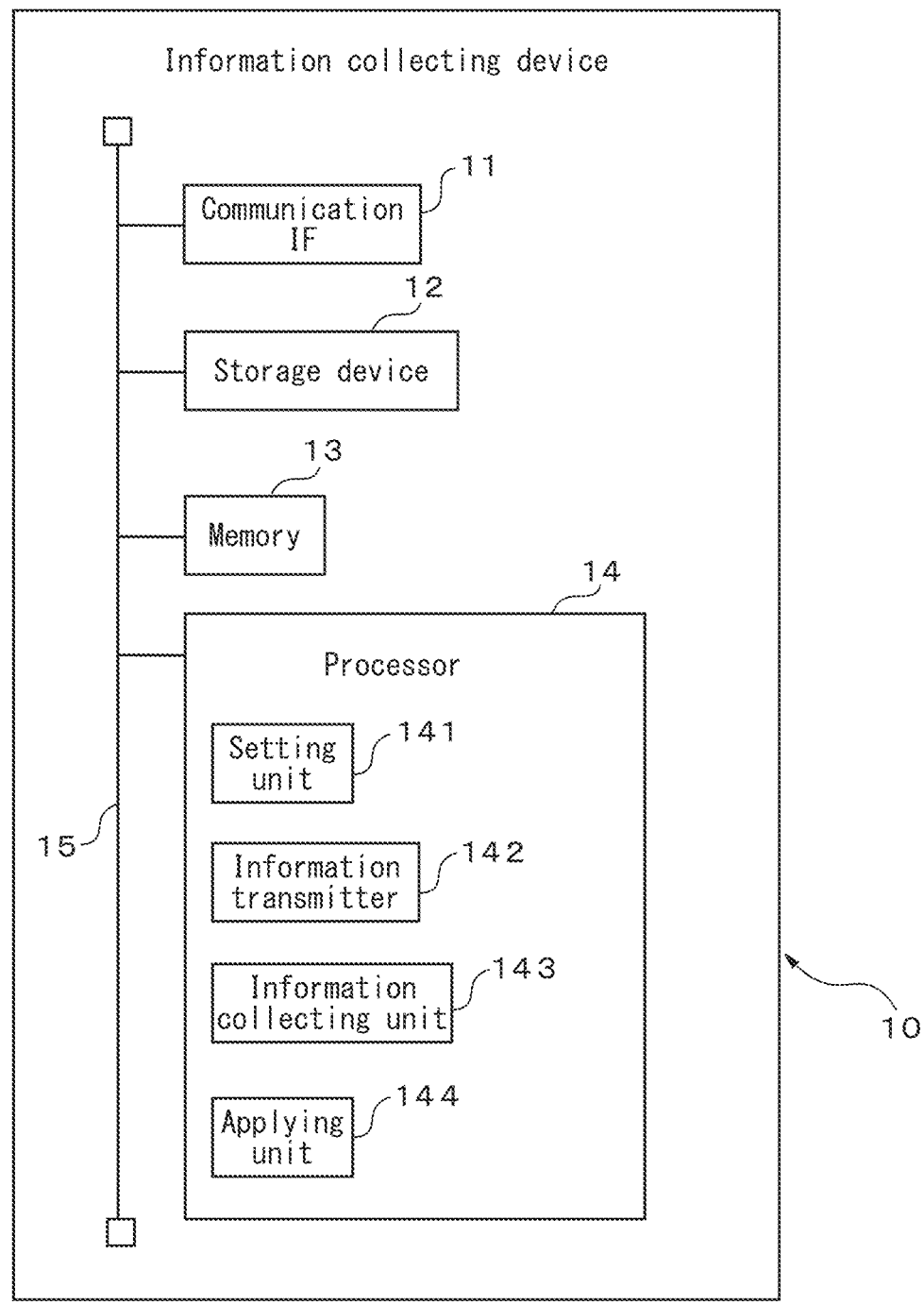
FIG. 2 is a hardware configuration diagram of an information collecting device.

FIG. 2 is a hardware configuration diagram of an information collecting device 10. The information collecting device 10 has a communication interface (IF) 11, a storage device 12, a memory 13 and a processor 14. The communication IF 11, storage device 12, memory 13 and processor 14 are connected via signal wires 15. The information collecting device 10 may also has an input device such as a keyboard and mouse, and a display device such as a liquid crystal display.

The communication IF 11 is an example of a communication unit, and it has an interface circuit to connect the information collecting device 10 with the communication network 2. The communication IF 11 is configured to be able to communicate with the information acquisition terminal 20 through the communication network 2, macrocell base station 3 or small cell base station 4. Specifically, the information collecting device 10 relays to the processor 14 personal information and the like that has been received from the information acquisition terminal 20 via the macrocell base station 3 or small cell base station 4 and communication network 2. The communication IF 11 also transmits space information received from the processor 14, to the information acquisition terminal 20 via the communication network 2 and the macrocell base station 3 or small cell base station 4.

The storage device 12 is an example of a memory, and it comprises, for example, a hard disk device or optical recording medium, and a device for accessing it. The storage device 12 stores personal information for the resident 5 that has been collected by the processor 14. The storage device 12 stores terminal identification information for identifying the information acquisition terminal 20, and resident identification information for identifying the resident 5 using the information acquisition terminal 20, in an associated manner. Personal information of the resident 5 collected by the processor 14 is stored in the storage device 12 in association with the resident identification information. The storage device 12 may also store a computer program for carrying out processing by the information collecting device 10 related to personal information collection processing, which is carried out in the processor 14.

The memory 13 is another example of a memory unit, and it has a non-volatile semiconductor memory and a volatile semiconductor memory, for example. The memory 13 also temporarily stores each of the data items generated during execution of the personal information collection processing that is in association with the information collecting device 10, and information acquired by communication with the information acquisition terminal 20, as space information.

The processor 14 comprises one or more CPUs (Central Processing Units) and their peripheral circuits. The processor 14 may also have other computing circuits such as a logical operation unit or numerical calculation unit. The processor 14 executes the personal information collection processing that is in association with the information collecting device 10.

The processor 14 has a setting unit 141, an information transmitter 142, an information collecting unit 143 and an applying unit 144. Each of the units of the processor 14 are functional modules driven by a computer program operating on the processor 14, for example. Alternatively, each of the units of the processor 14 may be specialized computing circuits in the processor 14.

Figure 3:
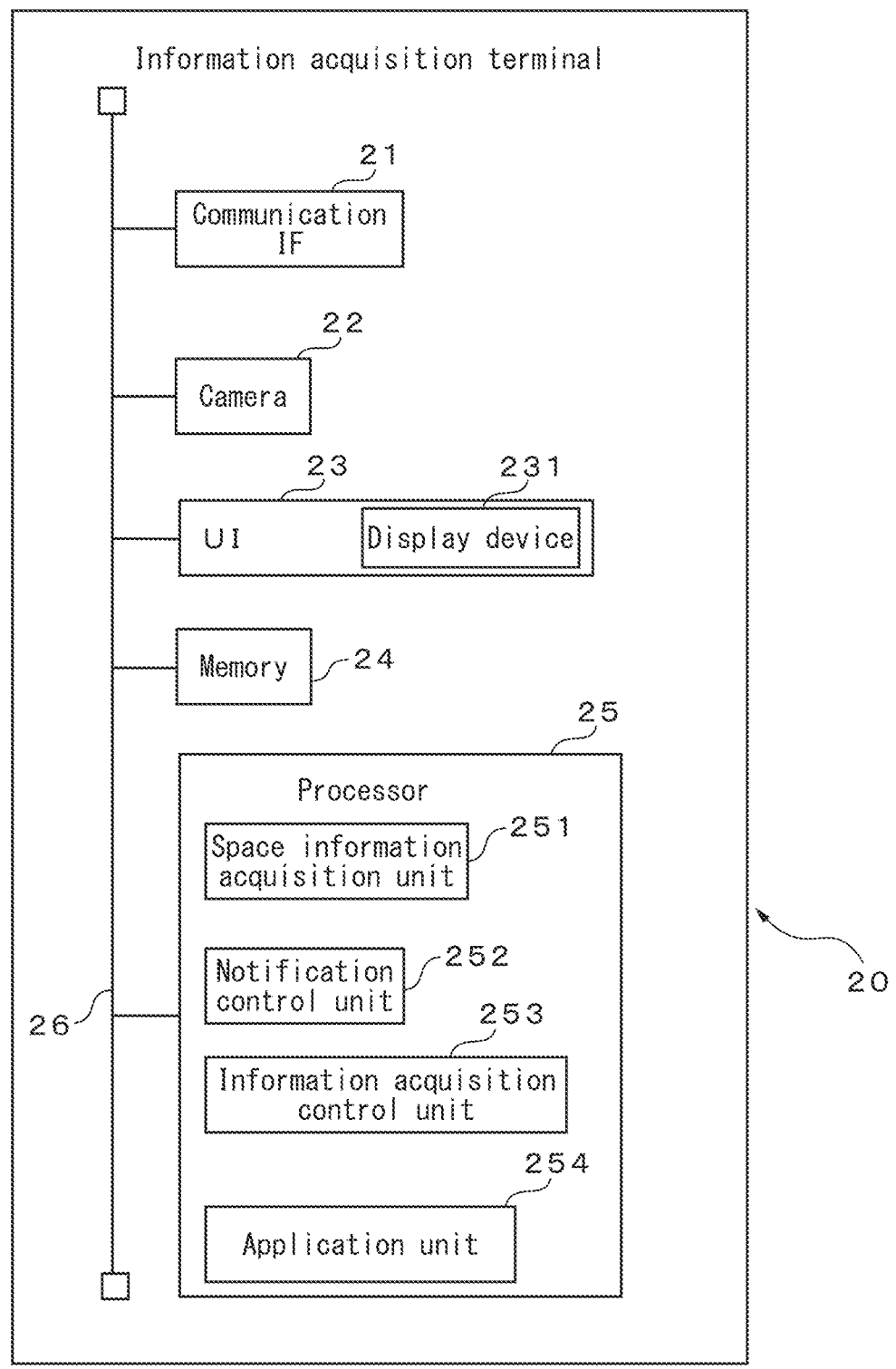
FIG. 3 is a hardware configuration diagram of an information acquisition terminal.

FIG. 3 is a hardware configuration diagram of an information acquisition terminal 20. The information acquisition terminal 20 has a communication interface (IF) 21, a camera 22, a user interface (UI) 23, a memory 24 and a processor 25. The communication IF 21, camera 22, user interface 23, memory 24 and processor 25 are connected via signal wires 26.

The communication IF 21 is an example of a communication unit, and it has an interface circuit to connect the information acquisition terminal 20 with the communication network 2. The communication IF 21 is configured to be able to communicate with the information collecting device 10 through the macrocell base station 3 or small cell base station 4 and the communication network 2. Specifically, the information acquisition terminal 20 relays to the processor 25 space information and the like that has been received from the information collecting device 10 via the communication network 2 and the macrocell base station 3 or small cell base station 4. The communication IF 11 also transmits personal information received from the processor 14, to the information collecting device 10 via the macrocell base station 3 or small cell base station 4 and the communication network 2.

The camera 22 is an example of an imaging unit. The camera 22 takes a camera image in which the surrounding environment of the information acquisition terminal 20 is represented. The camera 22 has a 2D detector composed of an array of photoelectric conversion elements with visible light sensitivity, such as a CCD or C-MOS, and an imaging optical system that forms an image of the photographed region on the 2D detector.

The UI 23 is an example of the notification unit. The UI 23 is controlled by the processor 25 to notify the resident 5 of each item of information. The UI 23 has a display device 231 such as a liquid crystal display or touch panel, for display of the items of information. The UI 23 also has a touch panel or operating button, for example, as an input device for inputting operation information from the resident 5 to the information acquisition terminal 20. The UI 23 outputs the input operation information to the processor 25 via a signal wire 26.

The memory 24 is an example of a memory unit, and it has a non-volatile semiconductor memory and a volatile semiconductor memory, for example. The memory 24 also temporarily stores each of the data items generated during execution of the personal information collection processing that is in association with the information acquisition terminal 20, and information acquired by communication with the information collecting device 10, as space information.

The processor 25 comprises one or more CPUs (Central Processing Units) and their peripheral circuits. The processor 25 may also have other computing circuits such as a logical operation unit or numerical calculation unit. The processor 25 executes the personal information collection processing that is in association with the information acquisition terminal 20.

The processor 25 has a space information acquisition unit 251, a notification control unit 252, an information acquisition control unit 253 and an application unit 254. Each of the units of the processor 25 are functional modules driven by a computer program operating on the processor 25, for example. Alternatively, each of the units of the processor 25 may be specialized computing circuits in the processor 25.

Figure 4:
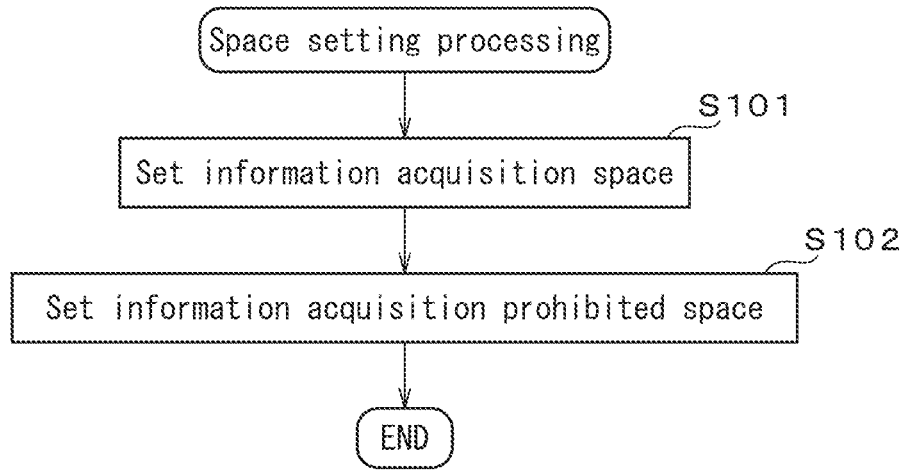
FIG. 4 is a flow chart showing an example of space setting processing with an information collecting device.

FIG. 4 is a flow chart showing an example of space setting processing with an information collecting device 10. The information collecting device 10 sets an information acquisition space R1 and an information acquisition prohibited space R2 in the smart city 100, according to a predetermined cycle or based on requests by a manager.

First, the setting unit 141 of the processor 14 of the information collecting device 10 sets the information acquisition space R1 in the smart city 100 (step S101). The information acquisition space R1 is identified based on space identification information for identification of spaces. The location of the information acquisition space R1 may be represented in a world coordinate system with a predetermined location as the origin. The setting unit 141 of the information collecting device 10 may set a predetermined space in the smart city 100 as the information acquisition space R1 or information acquisition prohibited space R2, based on the location, the date, the time or the day of the week. The setting unit 141 associates the space identification information of the information acquisition space R1 with the location of the information acquisition space R1, and stores this in the storage device 12.

The setting unit 141 sets the information acquisition prohibited space R2 in the smart city 100, thus completing the series of processing steps (step S102). The information acquisition prohibited space R2 is identified based on space identification information for identification of spaces. The location of the information acquisition prohibited space R2 may be represented in a world coordinate system. The setting unit 141 of the information collecting device 10 may set a predetermined space in the smart city 100 as the information acquisition prohibited space R2, based on the location, the date, the time or the day of the week. The setting unit 141 associates the space identification information of the information acquisition prohibited space R2 with the location of the information acquisition prohibited space R2, and stores this in the storage device 12.

The setting unit 141 may set the information acquisition space R1 or information acquisition prohibited space R2 in the smart city 100 based on the location, the date, the time or the day of the week. For example, the setting unit 141 may set the information acquisition space R1 or information acquisition prohibited space R2 as a room within the residence of the resident 5. The setting unit 141 may also set the information acquisition space R1 or information acquisition prohibited space R2 as a room within the residence of the resident 5 based on a request by the resident 5.

The setting unit 141 may also set a space including the resident 5 where prescribed conditions are met, to be the information acquisition space R1 or information acquisition prohibited space R2. For example, the setting unit 141 may set a room within the residence of the resident 5 where there is a predetermined family structure or age-structured family, as the information acquisition space R1 or information acquisition prohibited space R2.

When a room in the residence of the resident 5 is set as an information acquisition space R1 or information acquisition prohibited space R2, small cell base station identification information, for identification of the small cell base station situated in the room, is stored in the storage device 12 in association with the space identification information of the information acquisition space R1 or information acquisition prohibited space R2. The small cell base station identification information is used by the information collecting device 10 as information to determine that the information acquisition terminal 20 is located in the information acquisition space R1 or information acquisition prohibited space R2.

In the example shown in FIG. 1, the small cell base station 41 is situated in the living room 501 of the residence 500 of a resident, while the small cell base station 42 is situated in the bedroom 502.

When an outdoor space is set as an information acquisition space R1 or information acquisition prohibited space R2, positional information of the space represented by GNSS is stored in the storage device 12 in association with the space identification information of the information acquisition space R1 or information acquisition prohibited space R2.

The smart city 100 may also have spaces which are not set as either an information acquisition space R1 or information acquisition prohibited space R2. Spaces that are not information acquisition prohibited spaces R2 may all be set as information acquisition spaces R1.

In the example shown in FIG. 1, the setting unit 141 sets the living room 501 as an information acquisition space R1 and the bedroom 502 as an information acquisition prohibited space R2, in the residence 500 of the resident 5. The residence 500 may also have a room which is not set as either an information acquisition space R1 or information acquisition prohibited space R2. All rooms that are not information acquisition prohibited spaces R2 may be set as information acquisition spaces R1. The setting unit 141 may instead set only either one, an information acquisition space R1 or information acquisition prohibited space R2, for a room in the residence 500 of the resident 5.

Figure 5:
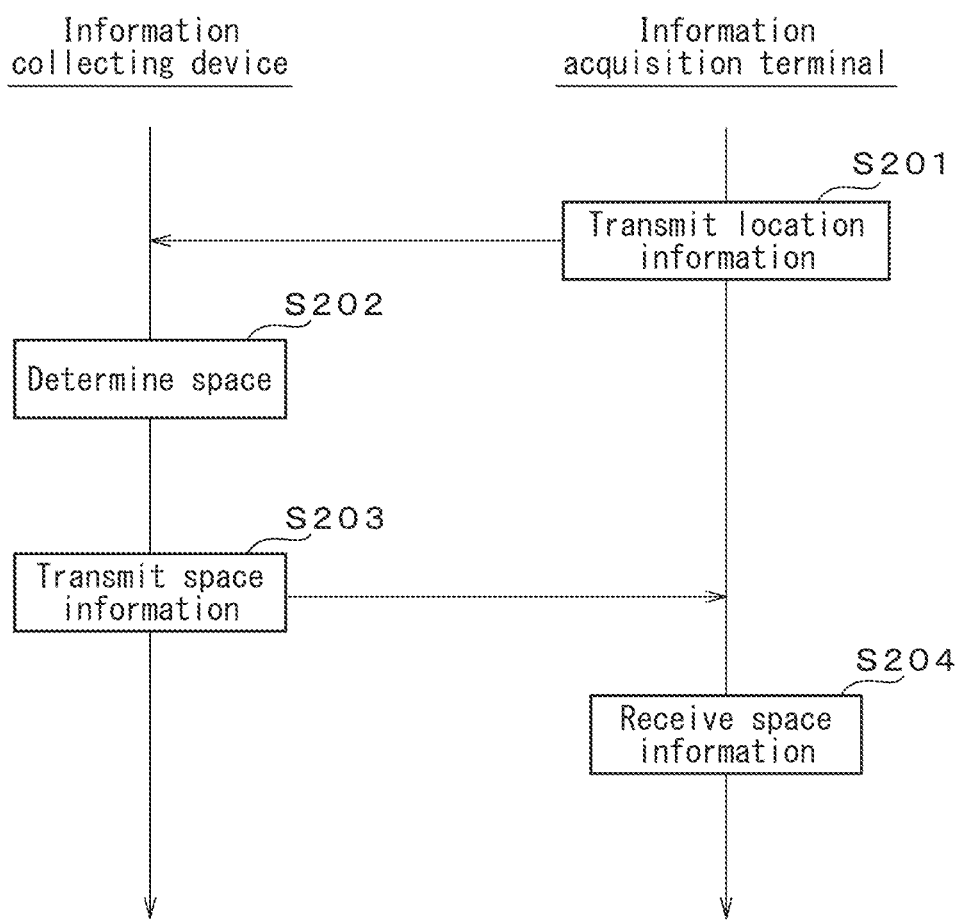
FIG. 5 is a sequence diagram showing space information acquisition processing with an information collecting system.

FIG. 5 is a sequence diagram showing space information acquisition processing with an information collecting system 1. The information acquisition terminal 20 carries out the space information acquisition processing shown in FIG. 5 at a space information acquisition time with a predetermined cycle.

First, the space information acquisition unit 251 of the processor 25 of the information acquisition terminal 20 transmits positional information representing the space in which the information acquisition terminal 20 is located, together with the terminal identification information, to the information collecting device 10 (step S201).

In the example shown in FIG. 1, when the information acquisition terminal 20 is located in the living room 501, the space information acquisition unit 251 transmits to the information collecting device 10 positional information which includes small cell base station identification information for identification of the small cell base station 41 through which the communication IF 21 communicates, together with the terminal identification information, via the small cell base station 41 and communication network 2. Also, when the information acquisition terminal 20 is located in the bedroom 502, the space information acquisition unit 251 transmits to the information collecting device 10 positional information which includes small cell base station identification information for identification of the small cell base station 42 through which the communication IF 21 communicates, together with the terminal identification information, via the small cell base station 42 and communication network 2.

Next, the information transmitter 142 of the processor 14 of the information collecting device 10 determines whether the space where the information acquisition terminal 20 is located is an information acquisition space R1 or information acquisition prohibited space R2, based on the positional information received from the information acquisition terminal 20 (step S202).

In the example shown in FIG. 1, when positional information has been received from the information acquisition terminal 20 located in the living room 501, the information transmitter 142 determines that the space where the information acquisition terminal 20 is located is an information acquisition space R1, based on the identification information of the small cell base station 41 contained in the positional information. When positional information has been received from the information acquisition terminal 20 located in the bedroom, the information transmitter 142 determines that the space where the information acquisition terminal 20 is located is an information acquisition prohibited space R2, based on the identification information of the small cell base station 42 contained in the positional information. The information transmitter 142 stores terminal identification information in the memory 13 in association with the space information.

The information transmitter 142 then transmits the space information representing the space where the information acquisition terminal 20 is located, to the information acquisition terminal 20 (step S203). The information transmitter 142 stores terminal identification information in the memory 13 in association with the space information.

In the example shown in FIG. 1, when the information acquisition terminal 20 is located in the living room 501, the information transmitter 142 transmits space information representing the information acquisition space R1 to the information acquisition terminal 20 via the communication network 2 and small cell base station 41. When the information acquisition terminal 20 is located in the bedroom 502, the information transmitter 142 transmits space information representing the information acquisition prohibited space R2 to the information acquisition terminal 20 via the communication network 2 and small cell base station 42.

The space information acquisition unit 251 of the information acquisition terminal 20 then receives the space information (step S204).

In the example shown in FIG. 1, when the information acquisition terminal 20 is located in the living room 501, the space information acquisition unit 251 receives space information indicating that it is an information acquisition space R1. When the information acquisition terminal 20 is located in the bedroom 502, the space information acquisition unit 251 receives space information indicating that it is an information acquisition prohibited space R2.

When the small cell base station identification information (or positional information for the space represented by GNSS) included in the positional information transmitted from the information acquisition terminal 20 is not associated with the information acquisition space R1 or information acquisition prohibited space R2, the information transmitter 142 of the information collecting device 10 determines that the information acquisition terminal 20 is not located in either an information acquisition space R1 or information acquisition prohibited space R2. The information transmitter 142 transmits information representing a halted processing space to the information acquisition terminal 20. The information acquisition terminal 20 does not transmit personal information when information representing a halted processing space has been received.

Figure 6:
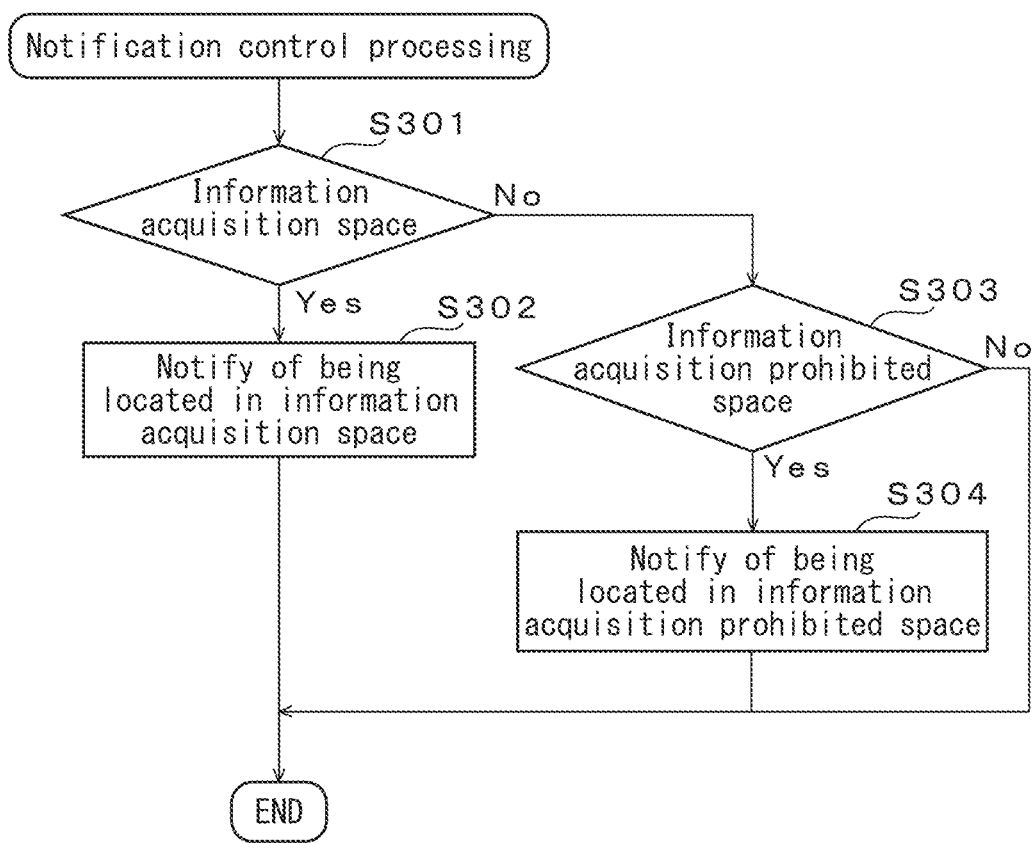
FIG. 6 is a flow chart showing an example of notification control processing with an information acquisition terminal.

FIG. 6 is a flow chart showing an example of notification control processing with an information acquisition terminal 20. The information acquisition terminal 20 carries out the notification control processing shown in FIG. 6 each time space information is received from the information collecting device 10.

First, the notification control unit 252 of the processor 25 of the information acquisition terminal 20 determines whether or not space information represents an information acquisition space R1 (step S301).

When the space information represents an information acquisition space R1 (step S301—Yes), the notification control unit 252 notifies the resident 5 via the UI 23 that the resident 5 is located in an information acquisition space R1 (step S302), and the series of processing steps is complete.

In the example shown in FIG. 1, the notification control unit 252 notifies the resident 5 that the resident 5 is located in an information acquisition space R1, by display on a display device 231. Since the resident 5 in the living room 501 is notified of being located in an information acquisition space R1, they are aware that personal information will be acquired in the living room 501. When acquisition of personal information is allowed in the residence 500, the resident 5 may remain in the living room 501, which is an information acquisition space R1.

When the space information does not represent an information acquisition space R1 (step S301—No), the notification control unit 252 determines whether or not the space information represents an information acquisition prohibited space R1 (step S303).

When the space information represents an information acquisition prohibited space R2 (step S303—Yes), the notification control unit 252 notifies the resident 5 via the UI 23 that the resident 5 is located in an information acquisition prohibited space R2 (step S304), and the series of processing steps is complete.

In the example shown in FIG. 1, the notification control unit 252 notifies the resident 5 that the resident 5 is located in an information acquisition prohibited space R2, by display on a display device 231. Since the resident 5 in the bedroom 502 is notified of being located in an information acquisition prohibited space R2, they are aware that personal information will not be acquired in the bedroom 502.

When space information does not represent an information acquisition prohibited space R2 (step S304—No), the notification control unit 252 completes the series of processing steps. In this case, the information acquisition terminal 20 receives information indicating that the space is a halted processing space, and since it is in a halted processing space which is neither an information acquisition space R1 nor an information acquisition prohibited space R2, no notification is given for the space.

By notifying the resident 5 of whether the resident 5 is in an information acquisition space R1 or in an information acquisition prohibited space R1, the information collecting system 1 can eliminate the need to acquire approval from the resident 5 for acquiring personal information. In addition, the resident 5 does not need to be requested to approve acquisition of personal information from the information collecting system 1 each time personal information is to be acquired.

Figure 7:
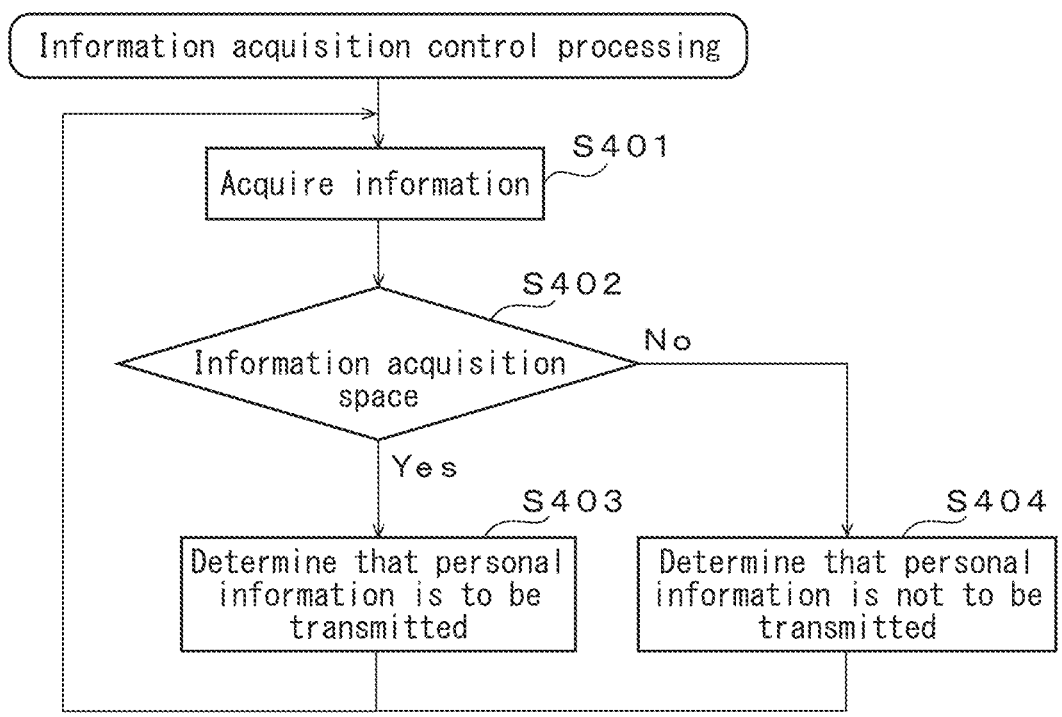
FIG. 7 is a flow chart showing an example of information acquisition control processing with an information acquisition terminal.

FIG. 7 is a flow chart showing an example of information acquisition control processing with an information collecting system 1. The information acquisition terminal 20 carries out the information acquisition control processing shown in FIG. 7 at an information acquisition control time with a predetermined cycle.

First, the information acquisition control unit 253 of the processor 25 of the information acquisition terminal 20 acquires personal information of the resident 5 (step S401). The personal information may be information acquired while the resident 5 is operating the information acquisition terminal 20, for example. The application unit 254 of the processor 25 of the information acquisition terminal 20 carries out, for example, web browsing processing, electronic commerce processing, mail send/receive processing, and camera image photograph processing using the camera 22. The information acquisition control unit 253 acquires personal information generated by processing executed by the application unit 254, while the resident 5 operates the information acquisition terminal 20.

The information acquisition control unit 253 then determines whether or not the current space information represents an information acquisition space R1 (step S402).

If the space information represents an information acquisition space R1 (step S402—Yes), the information acquisition control unit 253 determines that personal information is to be transmitted to the information collecting device 10 (step S403), and the process returns to step S401.

If the space information represents an information acquisition prohibited space R2, on the other hand (step S402—No), the information acquisition control unit 253 determines that personal information is not to be transmitted to the information collecting device 10 (step S404), and the process returns to step S401.

Figure 8:
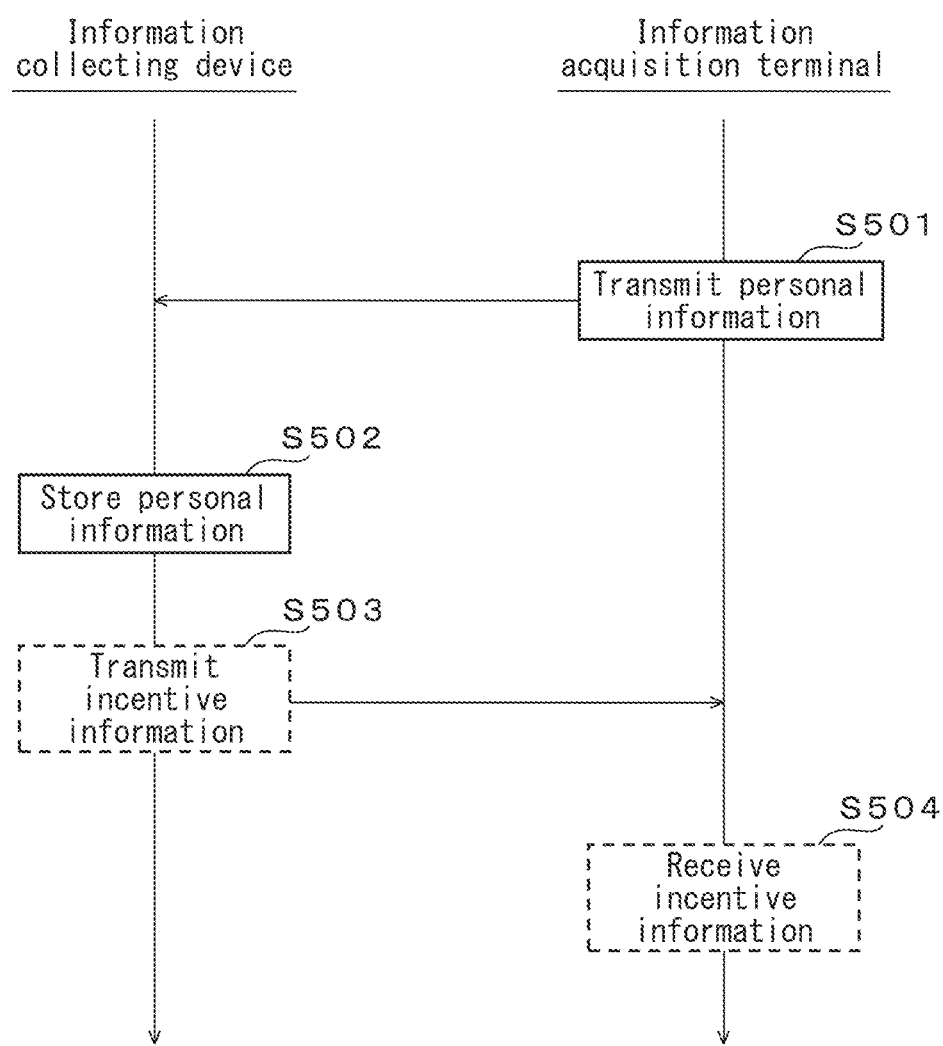
FIG. 8 is a sequence diagram showing an example of personal information transmission processing with an information collecting system.

FIG. 8 is a sequence diagram showing an example of personal information transmission processing with an information collecting system 1. In the information acquisition control processing shown in FIG. 7, the information collecting system 1 carries out the personal information transmission processing shown in FIG. 8 each time it determines that personal information is to be transmitted to the information collecting device 10.

First, the information acquisition control unit 253 of the processor 25 of the information acquisition terminal 20 transmits acquired personal information, together with terminal identification information, to the information collecting device 10 via the macrocell base station 3 or small cell base station 4 and the communication network 2 (step S501).

Next, the information collecting unit 143 of the processor 14 of the information collecting device 10 stores the received personal information in the storage device 12, in association with the resident identification information that is associated with the terminal identification information (step S502), thus completing the series of processing steps.

Another example of information collection processing by the information collecting system 1 will now be explained with reference to FIG. 9 to FIG. 12.

Figure 9:
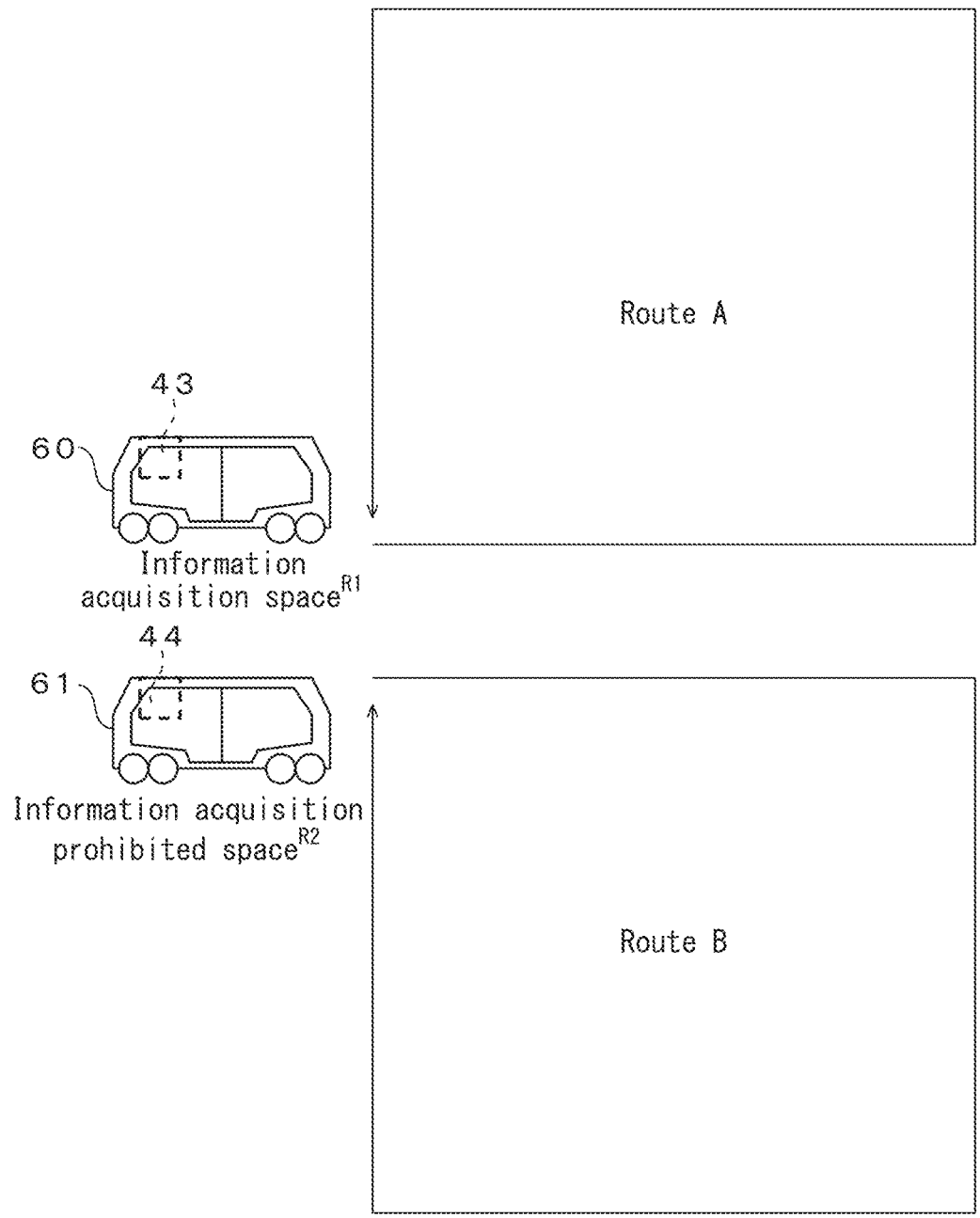
FIG. 9 is a diagram showing an example of an information acquisition space and an information acquisition prohibited space being set in a vehicle cabin.

FIG. 9 is a diagram showing an example of an information acquisition space R1 and information acquisition prohibited space R2 being set in a vehicle cabin.

In the example shown in FIG. 9, the setting unit 141 of the information collecting device 10 sets an information acquisition space R1 and information acquisition prohibited space R2 in the cabins of vehicles 60, 61 which are able to transport residents 5. The vehicle 60 travels on route A set within a smart city 100, while vehicle 61 travels on route B. Residents 5 may board the vehicles 60, 61 at designated stations provided along the route. A small cell base station 43 is installed in the vehicle 60, and a small cell base station 44 is installed in the vehicle 61. The route A defines a driving route for the vehicle 60, and the route B defines a driving route for the vehicle 61.

Based on the driving routes defined by the routes of the vehicles 60, 61, the setting unit 141 sets an information acquisition space R1 and an information acquisition prohibited space R2 in the cabins of the vehicles 60, 61. The setting unit 141 sets the cabin of the vehicle 60 traveling on route A to be an information acquisition space R1, and sets the cabin of the vehicle 61 traveling on route B to be an information acquisition prohibited space R2. The setting unit 141 may instead set the vehicle cabin to be only either one of an information acquisition space R1 or information acquisition prohibited space R2.

When a resident 5 has boarded the vehicle 60, the space information acquisition unit 251 of the information acquisition terminal 20 carried by the resident 5 transmits to the information collecting device 10 positional information which includes small cell base station identification information for identification of the small cell base station 43 through which the communication IF 21 communicates, together with the terminal identification information, via the small cell base station 43 and communication network 2.

The information transmitter 142 of the information collecting device 10 transmits space information representing the information acquisition space R1 to the information acquisition terminal 20 via the communication network 2 and small cell base station 43.

The notification control unit 252 of the information acquisition terminal 20 notifies the resident 5 via the UI 23 that the resident 5 is located in an information acquisition space R1. The resident 5 can thus be aware that personal information will be acquired while riding the vehicle 60.

The information acquisition terminal 20 transmits personal information acquired at each information acquisition control time to the information collecting device 10, via the small cell base station 43 and communication network 2. Next, the information collecting unit 143 of the information collecting device 10 stores the received personal information in the storage device 12, in association with the resident identification information that is associated with the terminal identification information.

When a resident 5 has boarded the vehicle 61, however, the space information acquisition unit 251 of the information acquisition terminal 20 carried by the resident 5 transmits to the information collecting device 10 positional information which includes small cell base station identification information for identification of the small cell base station 44 through which the communication IF 21 communicates, together with the terminal identification information, via the small cell base station 43 and communication network 2.

The information transmitter 142 of the information collecting device 10 transmits space information representing the information acquisition prohibited space R2 to the information acquisition terminal 20 via the communication network 2 and small cell base station 44.

The notification control unit 252 of the information acquisition terminal 20 notifies the resident 5 via the UI 23 that the resident 5 is located in an information acquisition prohibited space R2. The resident 5 can thus be aware that personal information will not be acquired while riding the vehicle 61. The information acquisition control unit 253 of the information acquisition terminal 20 determines that personal information is not to be transmitted to the information collecting device 10 while the resident 5 is riding the vehicle 61.

Figure 10:
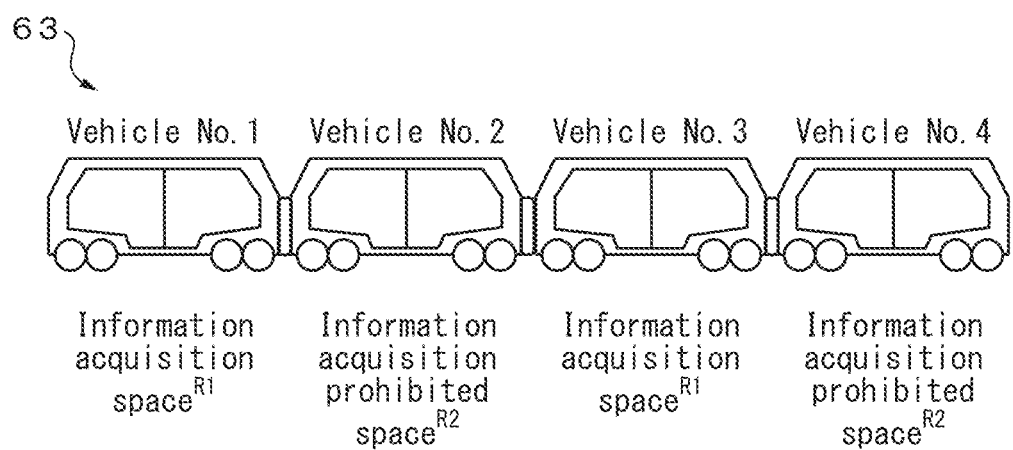
FIG. 10 is a diagram showing another example of an information acquisition space and an information acquisition prohibited space being set in a vehicle cabin.

FIG. 10 is a diagram showing another example of an information acquisition space R1 and information acquisition prohibited space R2 being set in a vehicle cabin. A vehicle complex 63 is composed of four vehicles in linkage, with the cabin of each vehicle being set as an information acquisition space R1 or information acquisition prohibited space R2. In the example shown in FIG. 10, the cabins of odd-numbered vehicles are set as information acquisition spaces R1, while the cabins of even-numbered vehicles are set as information acquisition prohibited spaces R2. When a resident 5 is to allow acquisition of personal information, for example, they may stay in an odd-numbered vehicle. When a resident 5 does not want personal information acquired, however, they may move to an even-numbered vehicle.

Figure 11:
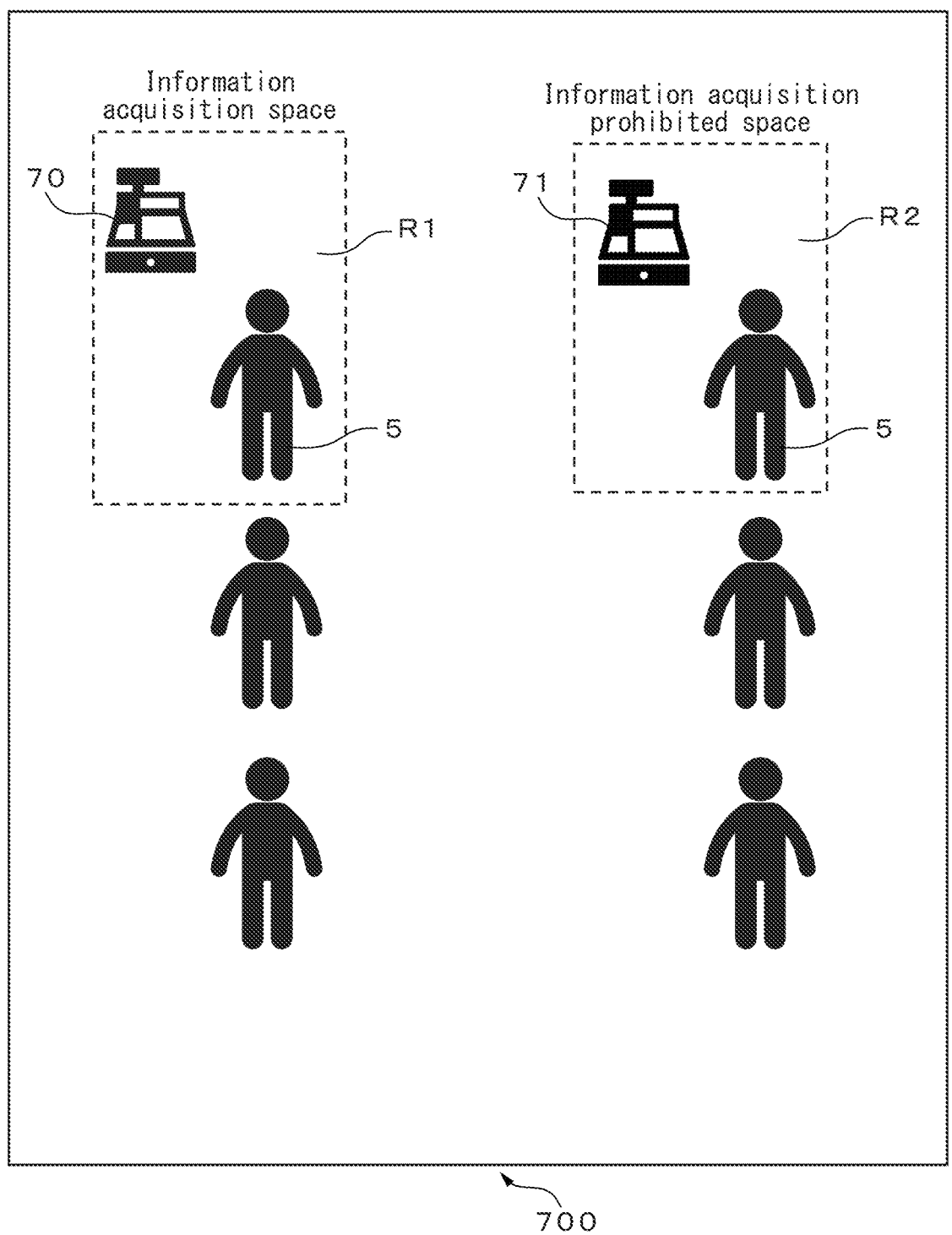
FIG. 11 is a diagram showing an example of an information acquisition space and an information acquisition prohibited space being set in a shop.

FIG. 11 is a diagram showing an example of an information acquisition space R1 and information acquisition prohibited space R2 set in a shop 700. The setting unit 141 of the information collecting device 10 sets the information acquisition space R1 and information acquisition prohibited space R2 in the space within the shop 700 of the smart city 100. In the example shown in FIG. 11, the setting unit 141 sets the information acquisition space R1 and information acquisition prohibited space R2 based on the location of cash registers 70, 71 in the shop 700. The setting unit 141 may instead set a space in the shop 700 to be only either one of an information acquisition space R1 or information acquisition prohibited space R2.

The cash register 70 and cash register 71 are communicable with the information acquisition terminal 20, as small cell base stations, and residents 5 can conduct electronic payments for products by making purchases in the shop 700.

The setting unit 141 sets a designated space including the cash register 70 as an information acquisition space R1. At the cash register 70, when a resident 5 makes an electronic payment for a product purchased at the shop 700 using the information acquisition terminal 20, the information acquisition terminal 20 acquires payment information along with the electronic payment, and transmits it to the information collecting device 10. The designated space that includes the cash register 70 is an area where the information acquisition terminal 20 can communicate with the cash register 70.

The setting unit 141 also sets a designated space including the cash register 71 as an information acquisition prohibited space R2. At the cash register 71, when a resident 5 makes an electronic payment for a product purchased at the shop 700 using the information acquisition terminal 20, the information acquisition terminal 20 does not transmit acquired payment information to the information collecting device 10. The designated space that includes the cash register 71 is an area where the information acquisition terminal 20 can communicate with the cash register 71.

When residents 5 line up to make electronic payments at the cash register 70 and enter into an area where the information acquisition terminal 20 carried by residents 5 can communicate with the cash register 70, the information acquisition terminal 20 begins to communicate with the cash register 70 and receive small cell base station identification information of the cash register 70. The information acquisition terminal 20 transmits to the information collecting device 10 the positional information that includes the small cell base station identification information of the cash register 70, together with the terminal identification information, via the cash register 70 and communication network 2.

The information transmitter 142 of the information collecting device 10 transmits space information representing the information acquisition space R1 to the information acquisition terminal 20 via the communication network 2 and cash register 70.

The notification control unit 252 of the information acquisition terminal 20 notifies a resident 5 via the UI 23 that the resident 5 is located in an information acquisition space R1. This allows the resident 5 to be aware that personal information will be acquired when they line up to pay at the cash register 70. When a resident 5 makes an electronic payment for a product purchased at the shop 700 using the information acquisition terminal 20, the information acquisition terminal 20 acquires personal information including the payment information, and transmits it to the information collecting device 10. Next, the information collecting unit 143 of the information collecting device 10 stores the received personal information in the storage device 12, in association with the resident identification information that is associated with the terminal identification information.

The information acquisition terminal 20 may also transmit personal information to the information collecting device 10 with different levels of detail of personal information including the payment information of the resident 5. The level of detail is increased with a greater number of items of information in the personal information. Information among such personal information includes the type and number of products purchased, the age of the resident 5 who is the purchaser, the gender of the resident 5, and the name of the shop where the product was purchased. The level of detail of personal information transmitted to the information collecting device 10 can be set and changed at the information acquisition terminal 20.

The processor 14 of the information collecting device 10 may also have an applying unit 144 that generates incentive information indicating an incentive to be applied to a resident 5 that has provided personal information in an information acquisition space R1 (see FIG. 2). The applying unit 144 generates incentive information based on the level of detail of acquired personal information. Specifically, the applying unit 144 generates incentive information so that a higher degree of incentive is applied to the resident 5 with a greater level of detail of personal information. The incentive information is, for example, coupon information that discounts the price of a product in the shop 700.

The applying unit 144 transmits the incentive information to the information acquisition terminal 20 via the communication network 2 and small cell base station 43 (step S503 of FIG. 8). The information acquisition terminal 20 receives the incentive information (step S504 of FIG. 8). The notification control unit 252 of the information acquisition terminal 20 notifies the resident 5 of received incentive information, via the UI 23. The resident 5 can thus be given motivation to transmit more personal information to the information collecting device 10.

When residents 5 line up to make electronic payments at the cash register 71, on the other hand, and enter into an area where the information acquisition terminal 20 carried by residents 5 can communicate with the cash register 71, the information acquisition terminal 20 begins to communicate with the cash register 71 and receive small cell base station identification information of the cash register 71. The information acquisition terminal 20 transmits to the information collecting device 10 the positional information that includes the small cell base station identification information of the cash register 71, together with the terminal identification information, via the cash register 71 and communication network 2.

The information transmitter 142 of the information collecting device 10 transmits space information representing the information acquisition prohibited space R2 to the information acquisition terminal 20 via the communication network 2 and cash register 71.

The notification control unit 252 of the information acquisition terminal 20 notifies the resident 5 via the UI 23 that the resident 5 is located in an information acquisition prohibited space R2. This allows the resident 5 to be aware that personal information will not be acquired when they line up to pay at the cash register 70. Even when a resident 5 makes an electronic payment for a product purchased at the shop 700 using the information acquisition terminal 20, the information acquisition terminal 20 does not transmit to the information collecting device 10 any acquired personal information including the payment information.

By making electronic payments for purchased products at the cash register 71, residents 5 can ensure that personal information including payment information is not transmitted to the information collecting device 10.

Figure 12:
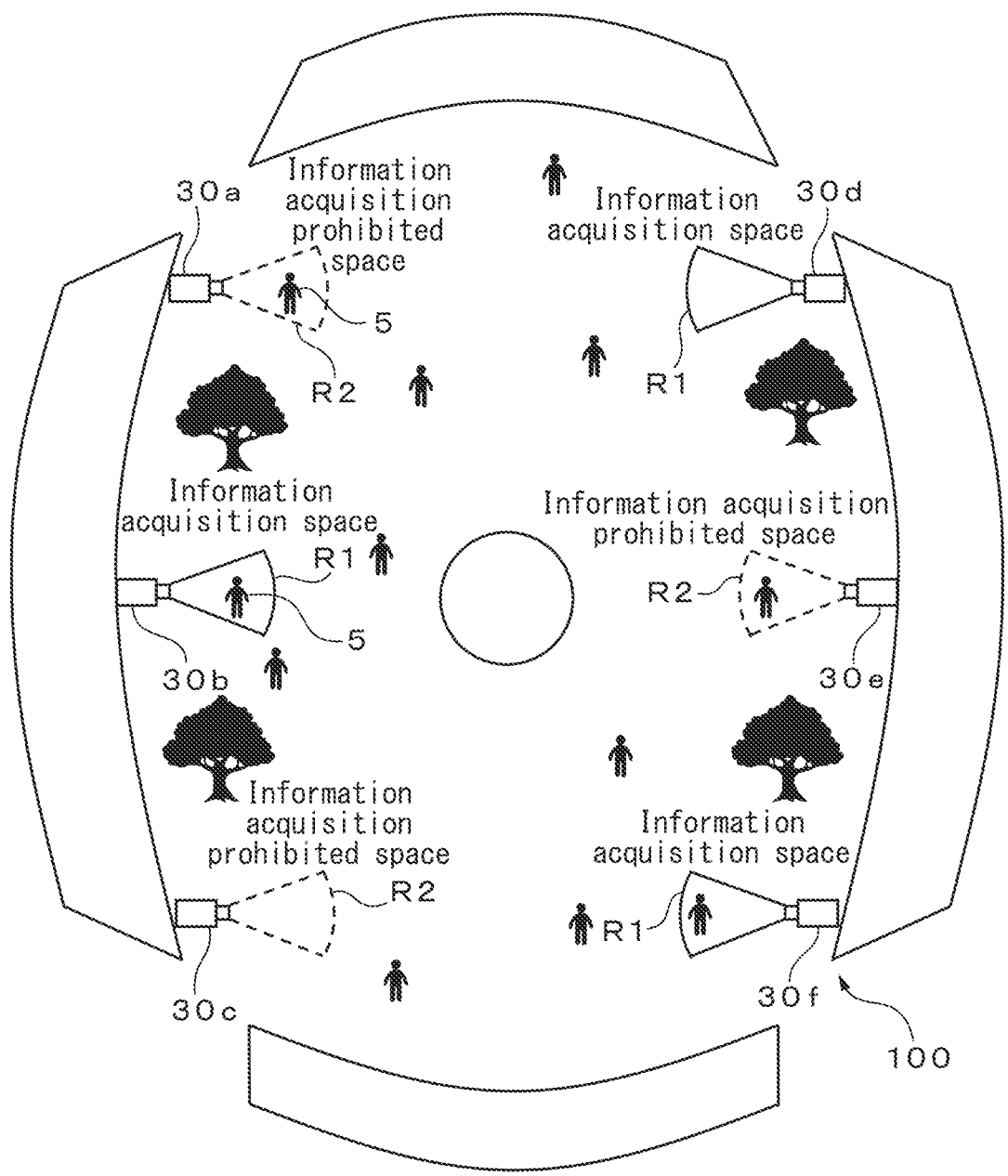
FIG. 12 is a diagram showing an example of information acquisition spaces and information acquisition prohibited spaces being set in spaces photographed by a surveillance camera.

FIG. 12 is a diagram showing an example of an information acquisition space R1 and an information acquisition prohibited space R2 being set for spaces photographed by a surveillance camera.

In the example shown in FIG. 12, the setting unit 141 of the information collecting device 10 sets spaces photographed by surveillance camera devices 30a to 30f, which are examples of information acquisition terminals, as information acquisition spaces R1 or information acquisition prohibited spaces R2, based on the location, the date, the time or day of the week.

The surveillance camera devices 30a to 30f are situated in a smart city 100. Each of the surveillance camera devices 30a to 30f photographs the environment in a visual field. In some cases, a resident 5 may also be within the environment in the visual field. Therefore, when a resident 5 appears within a camera image photographed by one of the surveillance camera devices 30a to 30f, the camera image will contain personal information for that resident 5.

The surveillance camera devices 30a to 30f are connected to an information collecting device 10 via a communication network 2 and a gateway (not shown), as in FIG. 1. The surveillance camera devices 30a to 30f have a hardware configuration such as shown in FIG. 3.

The information acquisition spaces R1 and information acquisition prohibited spaces R2 of the surveillance camera devices 30a to 30f are determined for each surveillance camera device based on the visual field of the camera and the resolving power of the photographed camera image. Specifically, the scope of each of the information acquisition spaces R1 and information acquisition prohibited spaces R2 in the left-right direction is determined based on the visual field of the camera. The depth of each of the information acquisition spaces R1 and information acquisition prohibited spaces R2 is determined based on the extent to which a resident appearing in a photographed camera image may be identified.

In the example shown in FIG. 12, the spaces photographed by the surveillance camera devices 30b, 30d, 30f are set as information acquisition spaces R1, while the spaces photographed by the surveillance camera devices 30a, 30c, 30e are set as information acquisition prohibited spaces R2. For the purpose of the present specification, the points where the surveillance camera devices 30b, 30d, 30f are located are included in the information acquisition spaces R1, and the points where the surveillance camera devices 30a, 30c, 30e are located are included in the information acquisition prohibited spaces R2.

The surveillance camera devices 30a to 30f transmit terminal identification information to the information collecting device 10 via the communication network 2.

The information transmitter 142 of the information collecting device 10 refers to a correspondence table in which terminal identification information is associated with the locations of the surveillance camera devices 30a to 30f, and sets the spaces photographed by the surveillance camera devices 30b, 30d, 30f as information acquisition spaces R1, based on the date, the time or the day of the week. The information transmitter 142 also sets the spaces that can be photographed by the surveillance camera devices 30a, 30c, 30e as information acquisition prohibited spaces R2, based on the date, the time or the day of the week.

The information transmitter 142 transmits space information representing the information acquisition spaces R1 to the surveillance camera devices 30b, 30d, 30f, via the communication network 2. The information transmitter 142 also transmits space information representing the information acquisition prohibited spaces R2 to the surveillance camera devices 30a, 30c, 30e, via the communication network 2.

The surveillance camera devices 30b, 30d, 30f notify residents 5 via the display device 231 that the spaces photographed by the surveillance camera devices 30b, 30d, 30f are information acquisition spaces R1. The surveillance camera devices 30a, 30c, 30e also notify residents 5 via the display device 231 that the spaces that can be photographed by the surveillance camera devices 30a, 30c, 30e are information acquisition prohibited spaces R2. The visual field of each display device 231 matches the visual field of the camera, and the brightness of the display device 231 is set so as to reach the depth of the information acquisition space R1 or information acquisition prohibited space R2 so that the information displayed on the display device 231 is visible.

The surveillance camera devices 30b, 30d, 30f transmit photographed camera images to the information collecting device 10 via the communication network 2. The information collecting unit 143 of the information collecting device 10 stores the received camera images in the storage device 12, in association with the terminal identification information.

The surveillance camera devices 30a, 30c, 30e, on the other hand, do not transmit the photographed camera images to the information collecting device 10.

Residents 5 can avoid being photographed in the camera image by moving out of the spaces photographed by the surveillance camera devices 30b, 30d, 30f, having been notified that they are information acquisition spaces R1. Residents 5 can also be aware that camera images will not be transmitted to the information collecting device 10 when in the spaces photographed by the surveillance camera devices 30a, 30c, 30e, having been notified that they are information acquisition prohibited spaces R2.

As explained above, the information collecting system can reduce the processing required for a designated institution to obtain personal information for multiple residents living in a region managed by the institution.

The information collecting system and information collecting method of the embodiment described above according to the invention may implement appropriate modifications such as are within the scope of the gist thereof. Moreover, the technical scope of the invention is not limited to the embodiments described herein and includes the invention and its equivalents as laid out in the Claims.

For example, the spaces set as information acquisition spaces and information acquisition prohibited spaces are not limited to the aforementioned embodiments. The spaces set as information acquisition spaces and information acquisition prohibited spaces are not particularly restricted and may be various types of spaces. For example, the information acquisition spaces or information acquisition prohibited spaces may be set in rooms of a public facility such as a management agency.

In the embodiments described above, the information acquisition spaces and information acquisition prohibited spaces were set based on rooms in residences of residents, cabins of vehicles capable of transporting residents, spaces within shops or visual fields of imaging units. However, information acquisition spaces and information acquisition prohibited spaces may be simultaneously set in such spaces, or they may be set as parts of such spaces.

The invention claimed is:

1. An information collecting system that collects personal information for residents in a region in which multiple residents live and which is managed by a designated institution, wherein the system comprises:
    an information acquisition terminal that allows acquisition of personal information of residents, wherein the information acquisition terminal comprises a camera configured to acquire the personal information of residents; and
    an information collecting device that is wirelessly connected in a communicable manner to the information acquisition terminal and is managed by the designated institution, wherein
    the information collecting device includes a first processor configured to:
        set information acquisition spaces where acquisition of personal information of residents in the region is allowed and information acquisition prohibited spaces where acquisition of personal information of residents is prohibited, and
        transmit space information corresponding to a space in which an information acquisition terminal is located, for each information acquisition terminal located in the information acquisition spaces and the information acquisition prohibited spaces, and
    the information acquisition terminal has a second processor configured to determine that personal information acquired by the information acquisition terminal is not to be transmitted to the information collecting device when the information acquisition terminal is located in an information acquisition prohibited space, based on the received space information, wherein the information acquisition terminal comprises a user interface (UI) having a display, the second processor is configured to instruct the display to automatically display a first notification in response to the received space information indicating that the information acquisition terminal is located in one of the information acquisition spaces, and the second processor is configured to instruct the display to automatically display a second notification in response to the received space information indicating that the information acquisition terminal is in one of the information acquisition prohibited spaces, wherein
    the second processor is further configured to instruct the display to increase a brightness of the display in response to the information acquisition terminal being in one of the information acquisition spaces.

2. The information collecting system according to claim 1, wherein the first processor is further configured to set the information acquisition space or information acquisition prohibited space in the region based on location, date, time or day of the week.

3. The information collecting system according to claim 1, wherein the first processor is further configured to set the information acquisition space or information acquisition prohibited space in a room of a residence of the resident.

4. The information collecting system according to claim 1, wherein the first processor is further configured to set the information acquisition space or information acquisition prohibited space in a space within a shop.

5. The information collecting system according to claim 4, wherein the first processor is further configured to set the information acquisition space or information acquisition prohibited space based on the location of a cash register in a shop.

6. An information collecting system that collects personal information for residents in a region in which multiple residents live and which is managed by a designated institution, wherein the system comprises:
    an information acquisition terminal that allows acquisition of personal information of residents; and
    an information collecting device that is wirelessly connected in a communicable manner to the information acquisition terminal and is managed by the designated institution, wherein
    the information collecting device includes a first processor configured to:
        set information acquisition spaces where acquisition of personal information of residents in the region is allowed and information acquisition prohibited spaces where acquisition of personal information of residents is prohibited, and
        transmit space information corresponding to a space in which an information acquisition terminal is located, for each information acquisition terminal located in the information acquisition spaces and the information acquisition prohibited spaces, and
    the information acquisition terminal has a second processor configured to determine that personal information acquired by the information acquisition terminal is not to be transmitted to the information collecting device when the information acquisition terminal is located in an information acquisition prohibited space, based on the received space information, wherein
    the information acquisition terminal further includes a camera configured to acquire the personal information of residents, and
    the first processor is further configured to set a boundary of the information acquisition space based on a visual field of the camera, wherein
    the information acquisition terminal further includes a display, and the second processor is further configured to instruct the display to increase a brightness of the display in response to the information acquisition terminal being in one of the information acquisition spaces.

7. The information collecting system according to claim 1, wherein the first processor is further configured to set the information acquisition space or information acquisition prohibited space in the cabin of a vehicle that is capable of transporting a resident.

8. The information collecting system according to claim 7, wherein the first processor is further configured to set the information acquisition space or information acquisition prohibited space in the cabin of the vehicle based on a driving route of the vehicle.

9. The information collecting system according to claim 1, wherein the first processor is further configured to generate incentive information indicating an incentive to be applied to a resident that has provided personal information in the information acquisition space.

10. The information collecting system according to claim 9, wherein the first processor is further configured to generate the incentive information based on the level of detail of personal information that has been acquired.

11. An information collecting method in which personal information is collected for residents in a region in which multiple residents live and which is managed by a designated institution, wherein
an information collecting device managed by the designated institution sets an information acquisition space where acquisition of personal information of residents in the region is allowed and an information acquisition prohibited space where acquisition of personal information of residents is prohibited,
the information collecting device transmits space information corresponding to a space in which an information acquisition terminal is located, for each of information acquisition terminals which are located in information acquisition spaces and information acquisition prohibited spaces and which are able to acquire personal information of residents,
the information acquisition terminal determines that personal information acquired by an information acquisition terminal is not to be transmitted to the information collecting device when the information acquisition terminal is located in an information acquisition prohibited space, based on the received space information,
wherein the information acquisition terminal comprises a camera configured to acquire the personal information of residents;
the information acquisition terminal automatically displays on a user interface (UI) a first notification in response to the received space information indicating that the information acquisition terminal is located in one of the information acquisition spaces; and
the information acquisition terminal automatically displays on the UI a second notification in response to the received space information indicating that the information acquisition terminal is in one of the information acquisition prohibited spaces, and
the information acquisition terminal increases a brightness of the display in response to the information acquisition terminal being in one of the information acquisition spaces.

12. The information collection system according to claim 1, wherein the
camera is configured to image a first field of view, wherein the information collecting device is configured to transmit an instruction to the camera to set a first area, based the first field of view, as an information acquisition space, and the camera is configured to provide a notification that the first area is the information acquisition space.

13. The information collection system according to claim 12, wherein the information collecting device is further configured to set boundaries of the first area based on a first resolving power of the camera.

14. The information collection system according to claim 12, further comprising:
a second camera configured to image a second field of view, wherein the information collecting device is configured to transmit an instruction to the second camera to set a second area, based the second field of view, as an information acquisition space, and the second camera is configured to provide a notification that that the second area is the information acquisition prohibited space.

15. The information collection system according to claim 14, wherein the information collecting device is further configured to set boundaries of the second area based on a second resolving power of the second camera.

* * * * *